United States Patent
Tiana et al.

(10) Patent No.: US 9,908,639 B1
(45) Date of Patent: Mar. 6, 2018

(54) AIRFIELD CENTERED RANGE MARKERS

(71) Applicant: Rockwell Collins, Inc., Cedar Rapids, IA (US)

(72) Inventors: Carlo L. Tiana, Portland, OR (US); Weston J. Lahr, Sherwood, OR (US); Travis S. VanDerKamp, Marion, IA (US); Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/232,420

(22) Filed: Aug. 9, 2016

(51) Int. Cl.
*G01C 21/00* (2006.01)
*B64D 45/08* (2006.01)
*G08G 5/00* (2006.01)

(52) U.S. Cl.
CPC ........... *B64D 45/08* (2013.01); *G08G 5/0047* (2013.01)

(58) Field of Classification Search
None
See application file for complete search history.

(56) References Cited

U.S. PATENT DOCUMENTS

| | | | |
|---|---|---|---|
| 8,412,392 B2 * | 4/2013 | Jayathirtha | G05D 1/0676 701/14 |
| 2013/0188049 A1 * | 7/2013 | Koukol | G06T 7/0044 348/144 |

* cited by examiner

*Primary Examiner* — Adolf Dsouza
(74) *Attorney, Agent, or Firm* — Angel N. Gerdzhikov; Donna P. Suchy; Daniel M. Barbieri (57) ABSTRACT

An in aircraft computer renders graphical representations of airfield range marker extensions to a runway extended centerline, even when the runway extended centerline is not rendered. Crossbars of the runway extended centerline are extended as arc segments to the center of the display with chevrons indicating the relative location of the airfield. Distance marker billboards are replicated at the end of the extended arc segments. As the aircraft approaches the airfield, crossbars closer to the airfield are extended. Vertical markers maintain billboards corresponding to range rings around an airfield in a visually prominent location, even when the proximal portion of such range ring is not visible in the display.

17 Claims, 8 Drawing Sheets

AIRFIELD CENTERED RANGE MARKERS

BACKGROUND

Synthetic vision systems display the location of a destination airfield through the device of a dome centered on the airfield, as well as range to the airfield thru the device of a synthetic extended centerline for the selected runway (runway extended centerline), graduated with crossbars at 10, 5, and 3 miles from the runway threshold labeled with appropriate distance-remaining billboard markers, which fade based on proximity, as well as 2 and 1 mile crossbars without distance billboards. An equivalent presentation is displayed on a head-up display (HUD) with some HUD-specific features, and can be extended to head-worn display (HWD) systems.

When the airfield is nearby but outside the field of view of the display presentation, the crew no longer has situational awareness of airfield proximity, which is problematic especially on a short final leg. Consequently, it would be advantageous if an apparatus existed that is suitable for displaying distance markers to an airfield even when the airfield is not presented on a display.

SUMMARY

In one aspect, embodiments of the inventive concepts disclosed herein are directed to an aircraft computer rendering graphical representations of airfield range marker extensions to a runway extended centerline, even when the runway extended centerline is not rendered. Crossbars of the runway extended centerline are extended as arc segments to the center of the display. Distance marker billboards are replicated at the end of the extended arc segments.

In some embodiments, as the aircraft approaches the airfield, crossbars closer to the airfield are extended. In some embodiments, chevrons or directional indicators indicate the relative location of the airfield.

In a further aspect, vertical markers maintain billboards corresponding to range rings around an airfield in a visually prominent location, even when the proximal portion of such range ring is not visible in the display.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to in aircraft display systems for producing extended crossbars indicating distances along a runway extended centerline, even when the runway extended centerline is no longer displayed.

Figure 1:
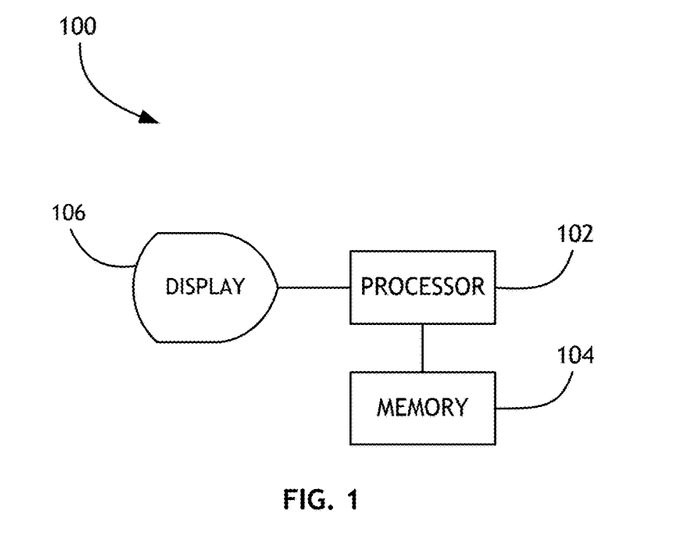
FIG. 1 shows an exemplary embodiment of a computer system according to the inventive concepts disclosed herein.
Figure 2:
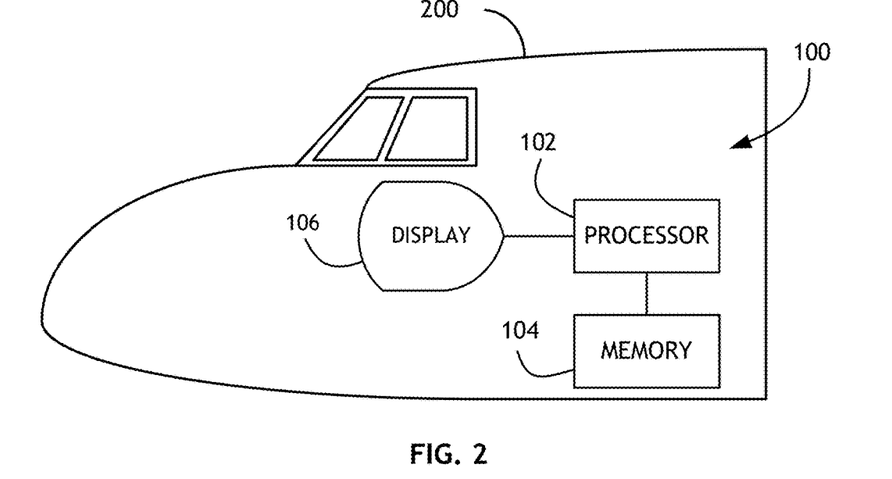
FIG. 2 shows an exemplary embodiment of an aircraft with a computer system according to the inventive concepts disclosed herein.

Referring to FIGS. 1 and 2, exemplary embodiments of a computer system 100 and an aircraft 200 according to the inventive concepts disclosed herein are shown. The computer system 100 includes a processor 102, memory 104 connected to the processor 102 for storing processor executable code, and a display 106 connected to the processor 102.

The processor 102 is configured via processor executable code to render extensions to a runway extended centerline and vertical markers associated with distance rings surrounding an airfield as more fully described herein.

Figure 3:
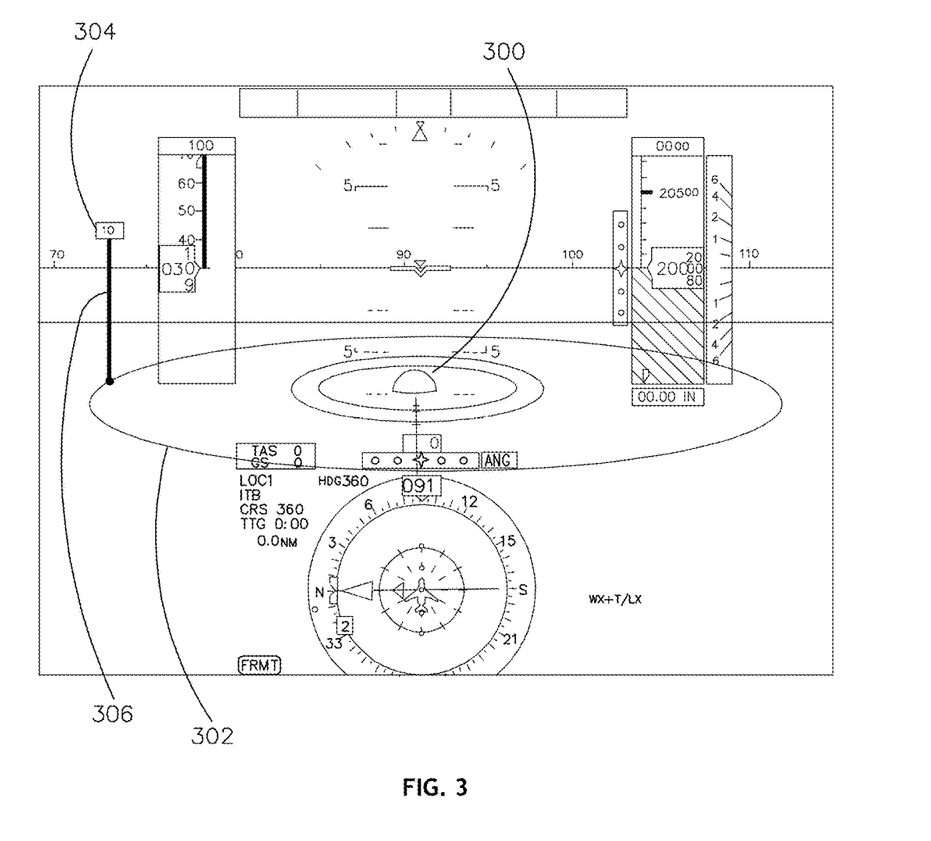
FIG. 3 shows a graphical representation of an airfield location overlay according to an exemplary embodiment of the inventive concepts disclosed herein.
Figure 4:
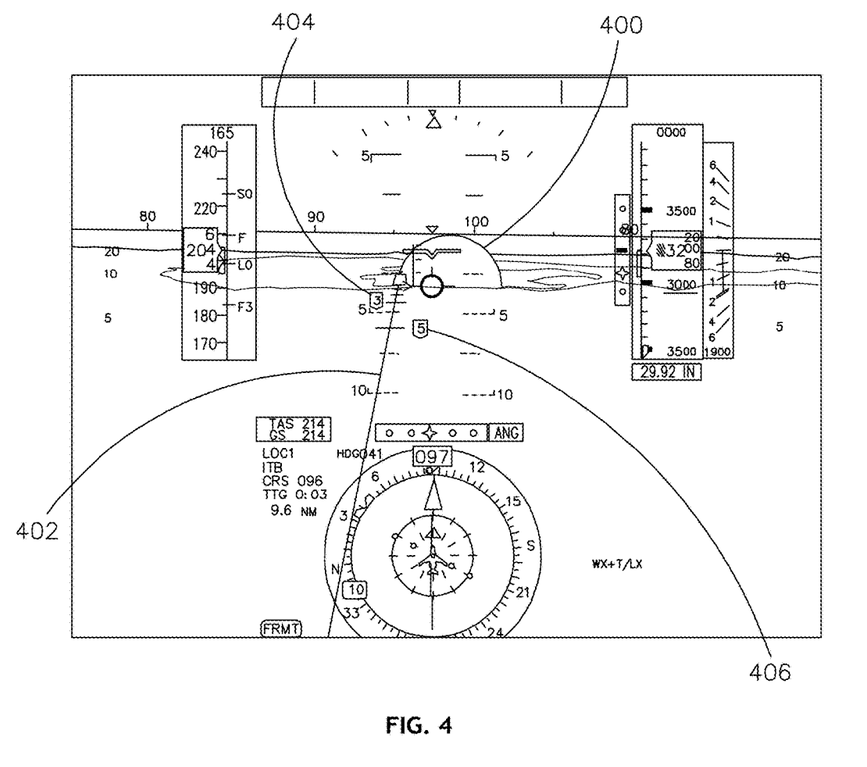
FIG. 4 shows a graphical representation of an airfield location overlay according to an exemplary embodiment of the inventive concepts disclosed herein.

Referring to FIG. 3, a graphical representation of an airfield location overlay according to an exemplary embodiment of the inventive concepts disclosed herein is shown. An airfield location 300 is generally displayed with a graphic such as a dome and corresponding concentric rings 302 showing distances to the airfield location 300 centered on a defined airfield reference point or runway threshold, and possibly identifying various types of airspace associated with the airport. Each ring 302 has a fixed radius that may be predefined or set by a pilot. In some embodiments, the rings 302 may be independent of the runway extended centerline and any corresponding distance markers.

In some embodiments, each ring 302 corresponds to a billboard 304 on a vertical marker 306 indicating a radius of the corresponding ring 302. The billboards 304 are displayed at ownership altitude with vertical markers 306 extending down to the rings and feature proximity-dependent fading such that the billboards 304 fade as the aircraft approaches to minimize visual clutter. In some embodiments, the vertical marker 306 is attached to the corresponding ring 302, and slides such that the vertical marker 306 is always in view but off to the side of the display 106.

In some embodiments, the vertical marker 306 remains centered in the display 106 to tell the pilot when he is over the ring 302, because at that point the nearest portion of the ring 302 is not visible in the display 106.

Figure 5:
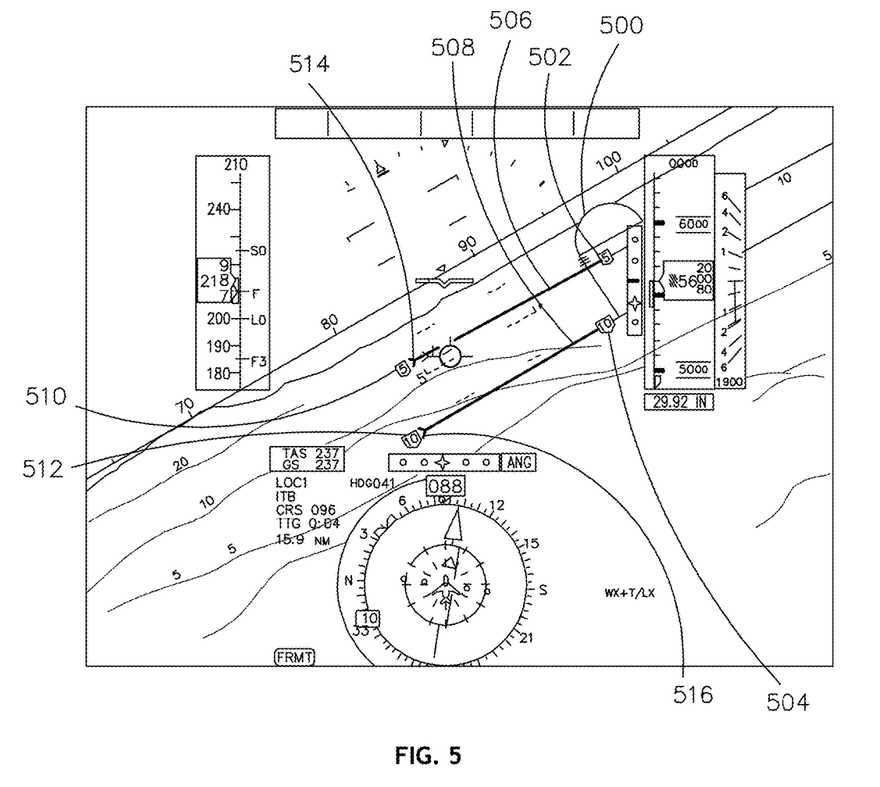
FIG. 5 shows a graphical representation of an airfield location overlay according to an exemplary embodiment of the inventive concepts disclosed herein.

Referring to FIGS. 4, 5, 6, and 7, graphical representations of airfield location 400, 500, 600 overlays according to exemplary embodiments of the inventive concepts disclosed herein are shown. Where an aircraft is generally oriented toward an airfield location 400, the display may define a runway extended centerline 402 connecting the airfield location 400 and the aircraft. Certain distances from the airfield location 400 are indicated by crossbars on the runway extended centerline 402 with distance billboards 404, 406 at certain predefined distances.

Where the aircraft is oriented such that the airfield location 500 is offset from the center of the display, as in FIG. 5, a processor generating the display identifies the predefined distances identified by the distance billboards 502, 504 and defines extensions 506, 508 to the crossbars associated with each distance billboard 502, 504. Each extension 506, 508 extends the corresponding crossbar to a terminating location substantially similar to where the distance billboards 502, 504 would be drawn if the airfield location 500 was centered in the display.

In some embodiments, the replicated distance billboards 510, 512 are drawn as the terminating location of each extension 506, 508.

In some embodiments, the terminating location of each extension 506, 508 is marked by a directional indicator 514, 516. The directional indicators 514, 516 indicate a relative direction from the replicated distance billboards 510, 512 toward the airfield location 500.

In some embodiments, the processor generating the display may define a minimum threshold deviation of the airfield location 500 from the center of the display before generating the extensions 506, 508.

Figure 6:
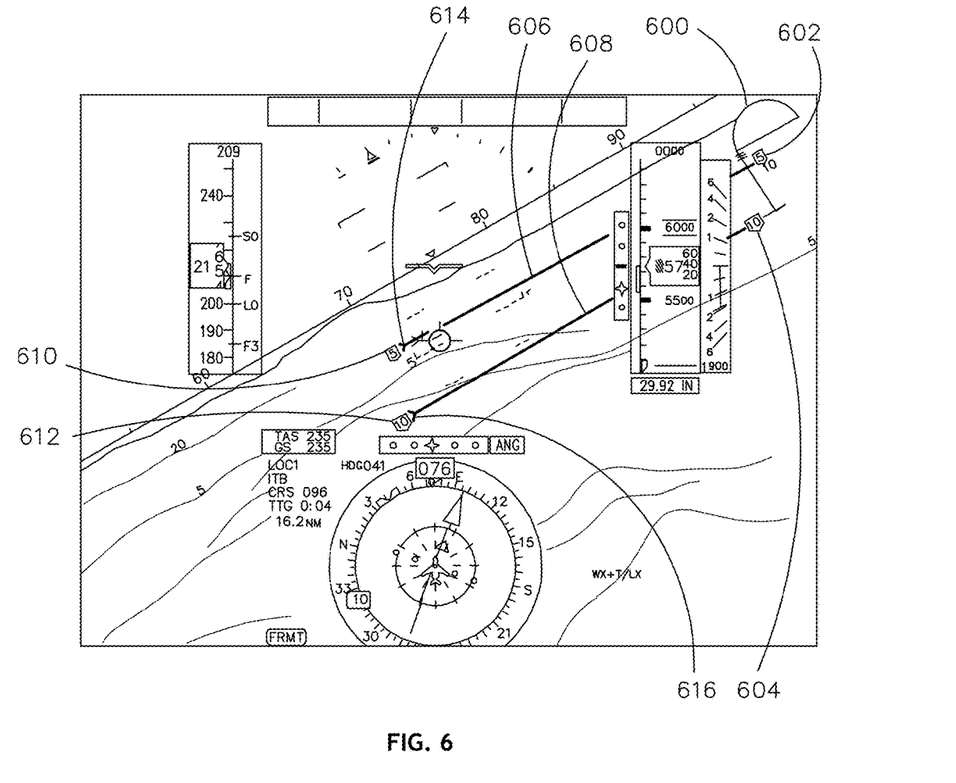
FIG. 6 shows a graphical representation of an airfield location overlay according to an exemplary embodiment of the inventive concepts disclosed herein.

In some embodiments, extensions 506, 508 are rendered separately based on the proximity of the aircraft. For example, a first extension 506 is associated with a crossbar 5 miles from the airfield while a second extension 508 is associated with a crossbar 10 miles from the airfield. As the aircraft approaches the airfield, the second extension 508 is rendered when the aircraft is a certain predefined distance from the airfield while the first extension 506 is not rendered. Subsequently, as the aircraft continues to approach the airfield, the second extension 508 may be removed and the first extension 506 is rendered.

Where the aircraft is oriented such that the airfield location 600 is further offset from the center of the display, as in FIG. 6, the processor generating the display maintains the replicated distance billboards 610, 612 in a prominent location in the display and modifies the extensions 606, 608 accordingly by increasing the length of each extension 606, 608 and maintaining a linear connection between each distance billboard 602, 604 and corresponding replicated distance billboard 610, 612.

The replicated distance billboards 610, 612 are maintained at the terminating location of each extension 606, 608, in a prominent portion of the display. In some embodiments, the processor generating the display maintains the replicated distance billboards 610, 612 at a fixed horizontal location but a floating vertical location such that the replicated distance billboards 610, 612 remain on a defined vertical axis no matter how much the airfield location 600 deviates from the center of the display.

Figure 7:
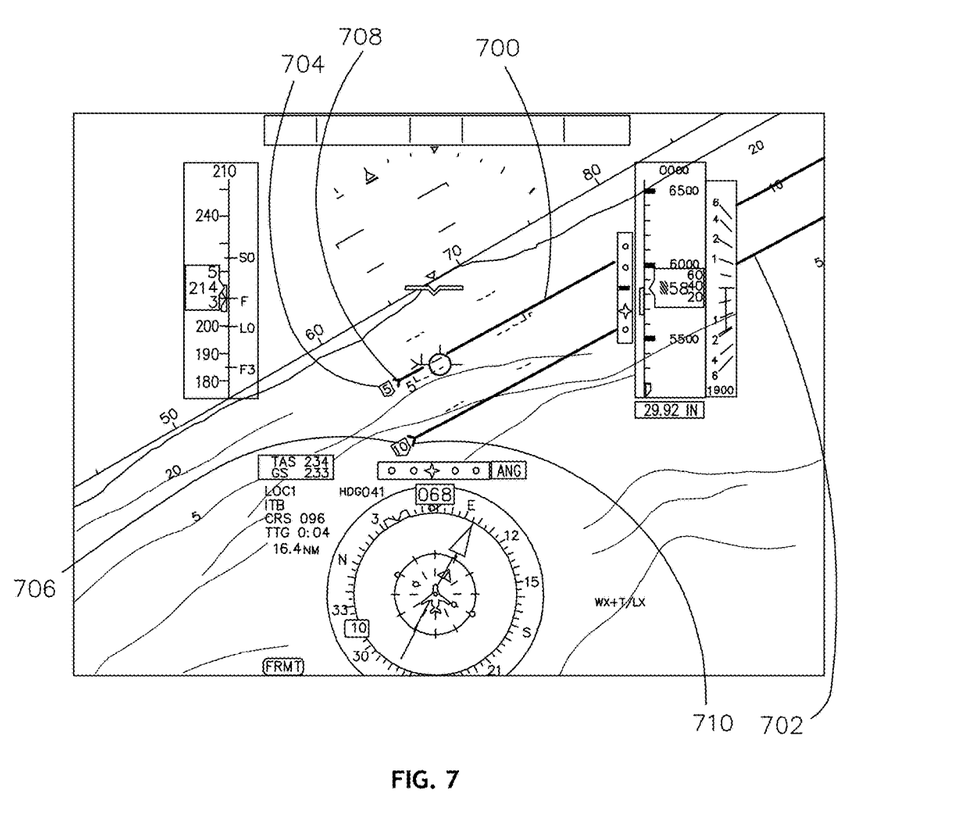
FIG. 7 shows a graphical representation of an airfield location overlay according to an exemplary embodiment of the inventive concepts disclosed herein.

In some embodiments, the terminating location of each extension 606, 608 is marked by a directional indicator 614, 616. The directional indicators 614, 616 indicate a relative direction from the replicated distance billboards 610, 612 toward the airfield location 600.

Where the aircraft is oriented such that the airfield location does not appear on the display, as in FIG. 7, a pilot would normally have no clearly displayed visual situational awareness of the airfield location. The processor generating the display maintains the replicated distance billboards 704, 706 in a prominent location in the display and modifies the extensions 700, 702 accordingly by increasing the length of each extension 700, 702 and maintaining a linear connection between each off-display distance billboard and corresponding replicated distance billboard 704, 706.

The replicated distance billboards 704, 706 are maintained at the terminating location of each extension 700, 702, in a prominent portion of the display. In some embodiments, the processor generating the display maintains the replicated distance billboards 704, 706 at a fixed horizontal location but a floating vertical location such that the replicated distance billboards 704, 706 remain on a defined vertical axis no matter how much the airfield location deviates from the center of the display.

In some embodiments, the terminating location of each extension 700, 702 is marked by a directional indicator 708, 710. The directional indicators 708, 710 indicate a relative direction from the replicated distance billboards 704, 706 toward the airfield location.

Figure 8:
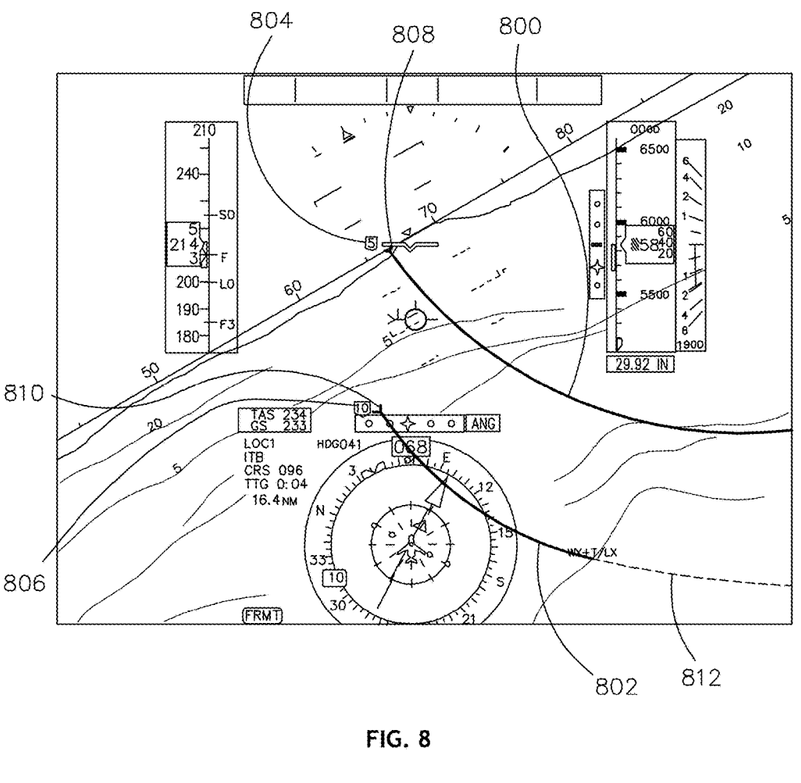
FIG. 8 shows a graphical representation of an airfield location overlay according to an exemplary embodiment of the inventive concepts disclosed herein.

Referring to FIG. 8, a graphical representation of an airfield location overlay according to an exemplary embodiment of the inventive concepts disclosed herein is shown. While certain embodiments describe linear extensions, in some embodiments, the extensions 800, 802 define arcs based on the distances indicated by the replicated distance billboards 804, 806 such that the extensions 800, 802 define constant distances from the corresponding airfield location over the entire length of the extension 800, 802. In some embodiments, such arc extensions 800, 802 are marked by directional indicators 808, 810 indicating relative directions from the replicated distance billboards 804, 806 toward the airfield location.

In some embodiments, the arc extensions 800, 802 comprise full "rings" around the airfield location. The extensions 800, 802 may be elevated from terrain based on the same logic as the corresponding runway extended centerline, including possible dashing 812 upon terrain penetration.

Figure 9:
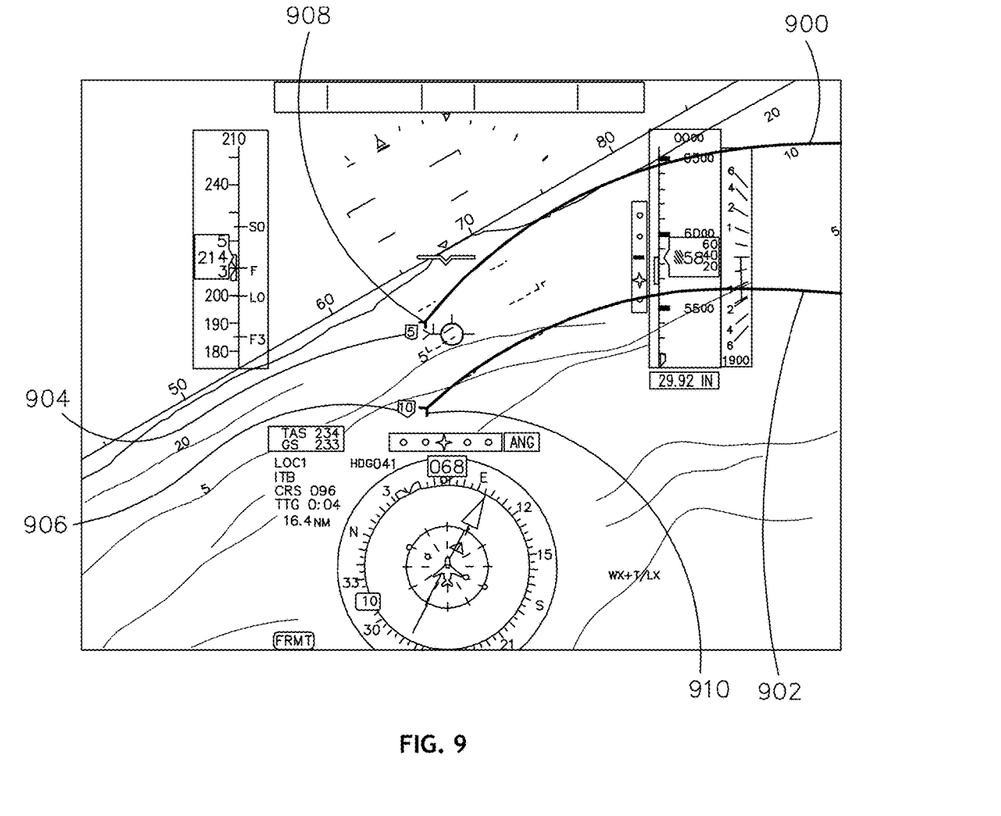
FIG. 9 shows a graphical representation of an airfield location overlay according to an exemplary embodiment of the inventive concepts disclosed herein.

Referring to FIG. 9, a graphical representation of an airfield location overlay according to an exemplary embodiment of the inventive concepts disclosed herein is shown. In some embodiments, the extensions 900, 902 correspond to arcs defining a calculated trajectory based on the speed of the corresponding aircraft to return to a direct heading to the airfield location at distances indicated by the replicated distance billboards 904, 906. In some embodiments, such arc extensions 900, 902 are marked by directional indicators 908, 910 indicating relative directions from the replicated distance billboards 904, 906 toward the airfield location.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. An apparatus comprising:
   a display;
   at least one processor coupled with the display and with a memory storing processor executable code for causing the at least one processor to:
      identify one or more crossbars, each of the one or more crossbars associated with a runway extended centerline;
      determine an extension to each of the one or more crossbars, each extension having a terminating location along a fixed vertical axis on the display;
      define a directional indicator associated with each extension; and
      render at least one extension of the one or more crossbars, and at least one directional indicator proximate to the terminating location of the associated extension, on the display.

2. The apparatus of claim 1, wherein each extension comprises an arc defining a constant distance from a reference point associated with the runway extended centerline.

3. The apparatus of claim 1, wherein the memory further stores processor executable code for causing the at least one processor to:
   receive a current trajectory;
   receive an airspeed; and
   calculate a new trajectory based on the trajectory and airspeed from a current position to the runway extended centerline at a distance associated with one of the one or more crossbars; and
   one of the extensions comprises an arc defined by the new trajectory.

4. The apparatus of claim 1, wherein the memory further stores processor executable code for causing the at least one processor to:
   define a billboard associated with each extension; and
   render each billboard proximate to the terminating location associated with the associated extension.

5. The apparatus of claim 1, wherein the memory further stores processor executable for causing the at least one processor to:
   identify one or more rings, each ring corresponding to a specified distance from an airfield;
   determine a horizontal axis on the display corresponding to an altitude of an aircraft;
   render a vertical marker from at least one of the one or more rings to a terminating location at the horizontal axis; and
   render a billboard proximate to the terminating location of the vertical marker.

6. An aircraft display system comprising:
   a display;
   at least one processor coupled with the display and with a memory storing processor executable code for causing the at least one processor to:
      identify one or more crossbars, each of the one or more crossbars associated with a runway extended centerline;
      determine an extension to each of the one or more crossbars, each extension having a terminating location along a fixed vertical axis on the display;
      define a directional indicator associated with each extension; and
      render at least one extension of the one or more crossbars, and at least one directional indicator proximate to the terminating location of the associated extension, on the display.

7. The aircraft display system of claim 6, wherein each extension comprises an arc defining a constant distance from a reference point associated with the runway extended centerline.

8. The aircraft display system of claim 6, wherein the memory further stores processor executable code for causing the at least one processor to:
   receive a current trajectory;
   receive an airspeed; and
   calculate a new trajectory based on the trajectory and airspeed from a current position to the runway extended centerline at a distance associated with one of the one or more crossbars; and
   one of the extensions comprises an arc defined by the new trajectory.

9. The aircraft display system of claim 6, wherein the memory further stores processor executable code for causing the at least one processor to:

define a billboard associated with each extension; and
render each billboard proximate to the terminating location associated with the associated extension.

10. The aircraft display system of claim 6, wherein:
the at least one extension comprises a first extension; and
the memory further stores processor executable code for causing the at least one processor to:
identify a distance of the aircraft from each location identified by the one or more crossbars;
de-render the first extension when the identified distance falls below a specified threshold; and
render a second extension of the one or more crossbars.

11. The aircraft display system of claim 6, wherein the memory further stores processor executable code for causing the at least one processor to:
identify one or more rings, each ring corresponding to a specified distance from an airfield;
determine a horizontal axis on the display corresponding to an altitude of an aircraft;
render a vertical marker from at least one of the one or more rings to a terminating location at the horizontal axis; and
render a billboard proximate to the terminating location of the vertical marker.

12. An apparatus comprising:
a display;
at least one processor coupled with the display and with a memory storing processor executable code for causing the at least one processor to:
identify one or more rings, each ring corresponding to a specified distance from an airfield;
identify a distance of the aircraft from each ring;
determine a horizontal axis on the display corresponding to an altitude of an aircraft;
render a vertical marker from at least one of the one or more rings to a terminating location at the horizontal axis;
de-render the vertical marker when the identified distance falls below a specified threshold; and
render a billboard proximate to the terminating location of the vertical marker.

13. The apparatus of claim 12, wherein the memory further stores processor executable code for causing the at least one processor to:
identify one or more crossbars, each of the one or more crossbars associated with a runway extended centerline;
determine an extension to each of the one or more crossbars, each extension having a terminating location along a fixed vertical axis on the display; and
render at least one extension of the one or more crossbars.

14. The apparatus of claim 13, wherein each extension comprises an arc defining a constant distance from a reference point associated with the runway extended centerline.

15. The apparatus of claim 13, wherein:
the memory further stores processor executable code for causing the at least one processor to:
receive a current trajectory;
receive an airspeed; and
calculate a new trajectory based on the trajectory and airspeed from a current position to the runway extended centerline at a distance associated with one of the one or more crossbars; and
one of the extensions comprises an arc defined by the new trajectory.

16. The apparatus of claim 13, wherein the memory further stores processor executable code for causing the at least one processor to:
define a billboard associated with each extension; and
render each billboard proximate to the terminating location associated with the associated extension.

17. The apparatus of claim 13, wherein the memory further stores processor executable code for causing the at least one processor to:
define a directional indicator associated with each extension; and
render each directional indicator proximately to the terminating location of the associated extension.

* * * * *